United States Patent [19]

Johnson

[11] 4,239,334

[45] Dec. 16, 1980

[54] OPTICAL THREE ROD WAVEGUIDE CONNECTOR

[75] Inventor: Tore R. Johnson, Harrisburg, Pa.

[73] Assignee: AMP Incorporated, Harrisburg, Pa.

[21] Appl. No.: 15,565

[22] Filed: Feb. 26, 1979

[51] Int. Cl.³ .................................................. G02B 5/14
[52] U.S. Cl. .................................................. 350/96.21
[58] Field of Search ...................................... 350/96.21

[56] References Cited

U.S. PATENT DOCUMENTS

| | | | |
|---|---|---|---|
| 3,989,567 | 11/1976 | Tardy | 350/96.21 |
| 4,019,241 | 4/1977 | Logan | 350/96.21 |
| 4,047,796 | 9/1977 | Kao et al. | 350/96.21 |
| 4,056,305 | 11/1977 | McCartney et al. | 350/96.21 |
| 4,061,416 | 12/1977 | Stewart | 350/96.21 |
| 4,087,155 | 5/1978 | Deacon | 350/96.21 |
| 4,094,580 | 6/1978 | Cook et al. | 350/96.21 |
| 4,123,139 | 10/1978 | Sandahl | 350/96.21 |

OTHER PUBLICATIONS

F. Thiel et al., "Optical Waveguide Cable Connection", Applied Optics, vol. 15, No. 11, Nov. 1976, pp. 2785–2791.

Primary Examiner—Stewart J. Levy
Attorney, Agent, or Firm—Richard B. O'Planick

[57] ABSTRACT

An optical waveguide connector is disclosed for coupling optical waveguides in coincident axial alignment. The connector comprises two intermateable connector bodies each provided with three rods in radial cooperation to define an elongate passageway therebetween. Two of the three rods are provided with diameters larger than the diameter of the third rod to make the sectional dimension of the passageway oversized with respect to the diameter of the waveguide inserted therein. Two of the three rods are further adapted to project forward from a connector body in a specified staggered arrangement with the rod projections of one connector body interfitting with the rod projections of a complimentary connector body to optically couple waveguides extending through the connector bodies.

9 Claims, 10 Drawing Figures

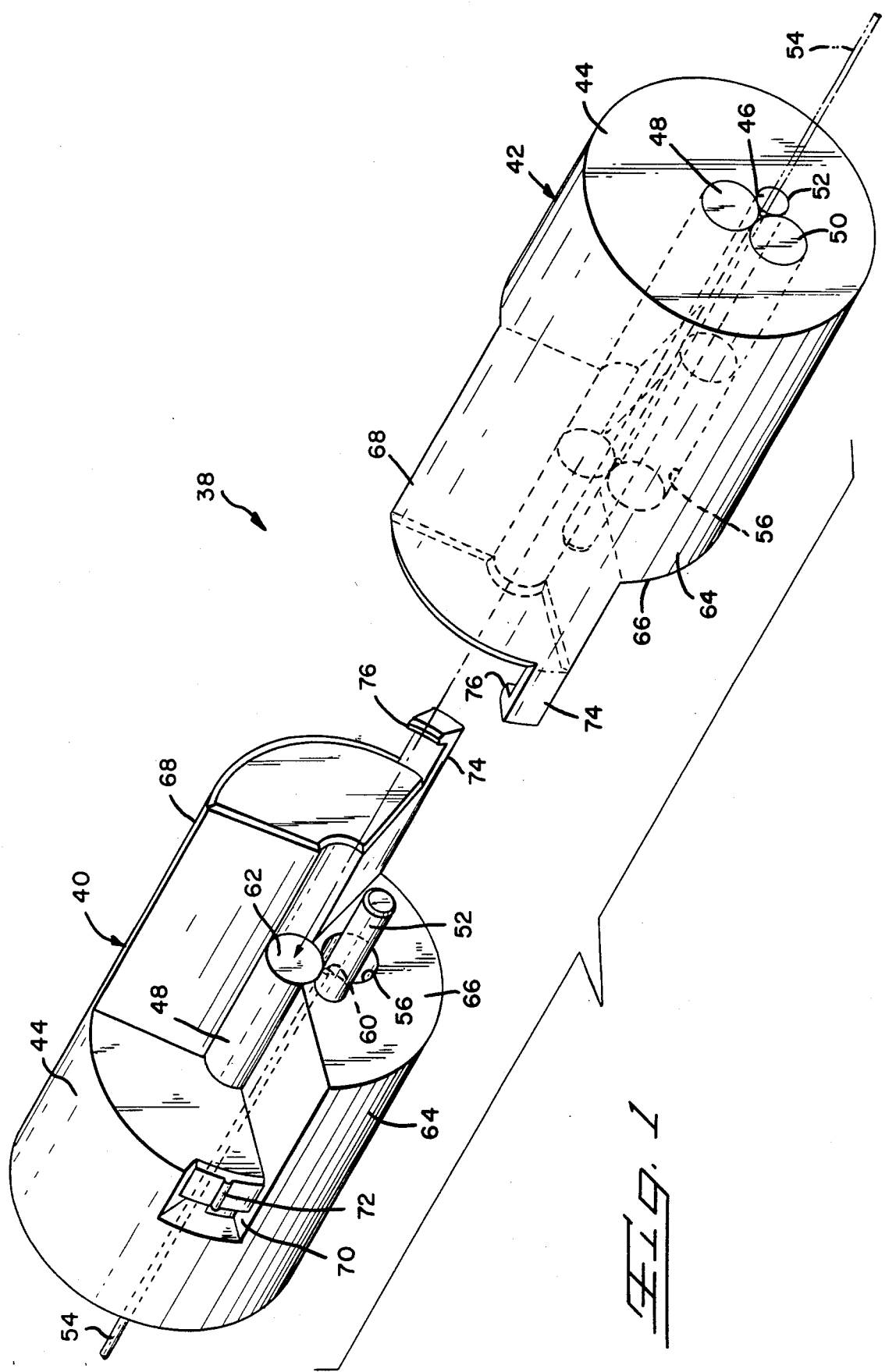

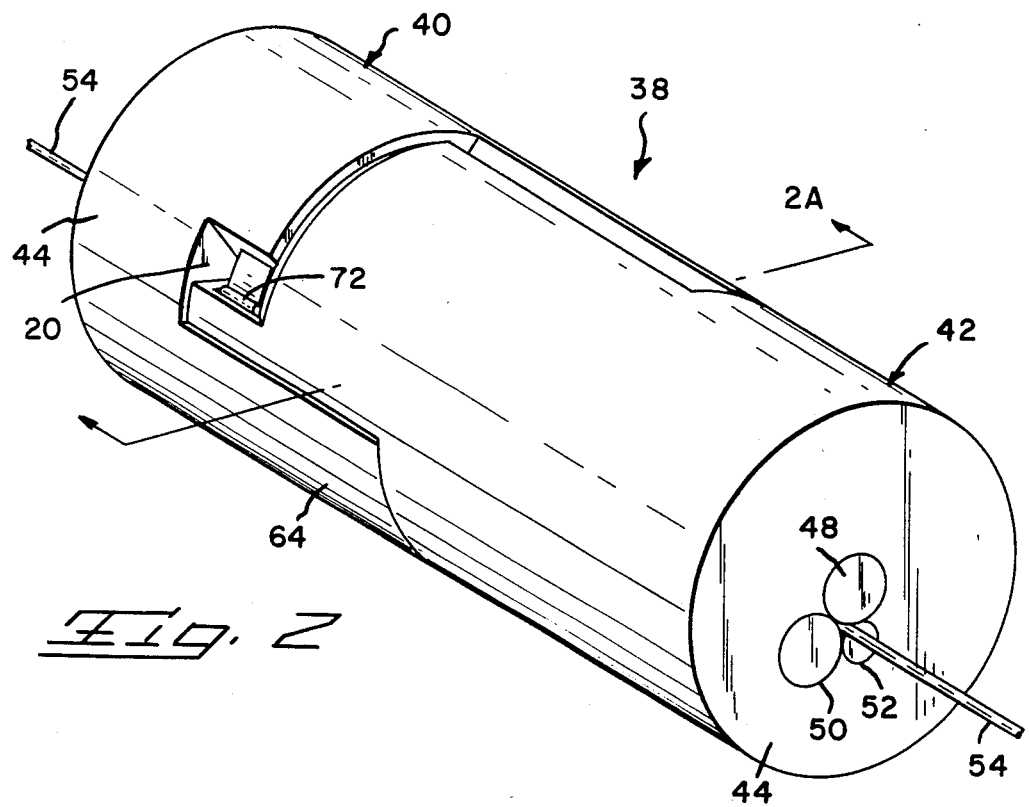
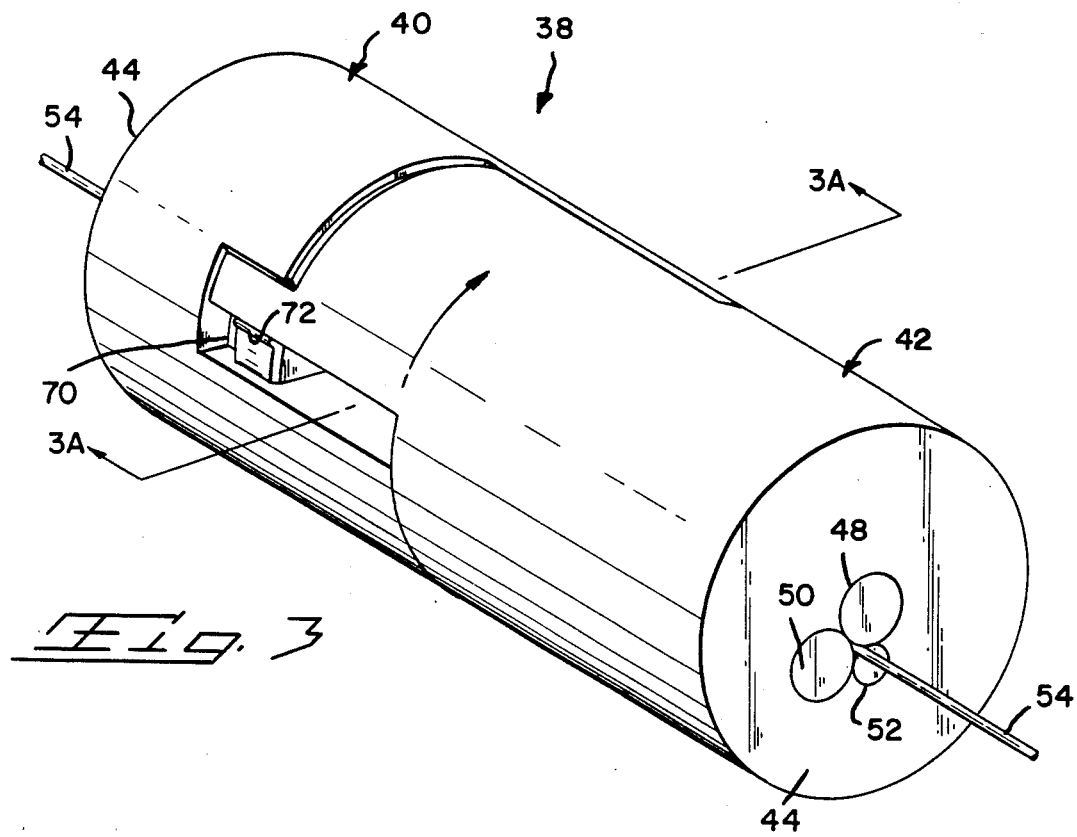

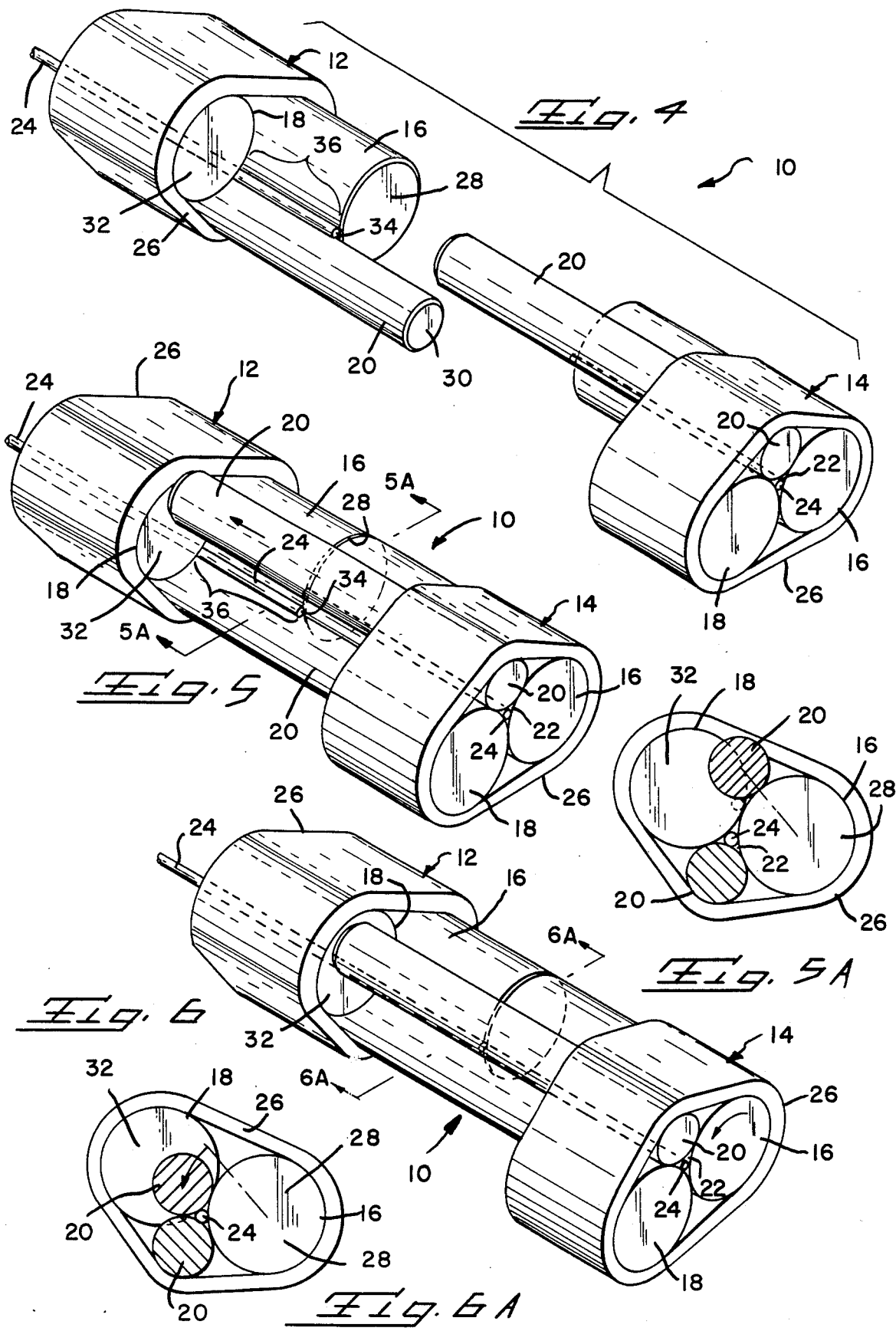

OPTICAL THREE ROD WAVEGUIDE CONNECTOR

BACKGROUND OF THE INVENTION

1. Field of the Invention

This invention relates generally to optical waveguide connectors and, more specifically, to waveguide connectors of the type utilizing three elongate rods which are arranged to interstitially define a waveguide receiving passageway therebetween.

2. The Prior Art

Data transmission point-to-point by the propogation of light waves through an optic waveguide is relatively well-known within the art. This technology, while enthusiastically endorsed by the communications industry, has presented myriad technical problems to those within the electrical industry who are concerned with developing hardware and, in particular, practical interconnection systems for the optical waveguides.

The electrical industry has been especially hard pressed to achieve a connector capable of optically coupling a pair of optic waveguides in a positive and dependable manner. Realization of such connector has been illusive because of the unique requirements made upon the connector in handling the fiber optic waveguides. One difficulty encountered is that the fragile nature of the waveguides tends to heighten the danger of their breakage during the coupling procedure: breakage which could adversely affect the optical integrity of the resulting connection. A further difficulty presented is receipt of the optical waveguide must be achieved by the connector even when the diameter of the waveguide can vary within a given specified range of tolerance limits. Still another problem is the requirement that the polished ends of the waveguides be protected by the connector from abrasive contact against foreign surfaces. Still further, the optical connector is faced with the requirement that the optical coupling juncture be minimized so as to reduce the gap loss of the transmitted signal, and that the coupled optic waveguides be axially aligned as precisely as possible so as to minimize the launch angle of radiation leaving one waveguide and entering the other.

Heretofore, no fiber optical connector had been achieved which could adhere to all of the above set forth performance constraints. One promising connector approach examined by the industry has been the utilizion of intermateable connector halves, each of which being provided with three cylindrical rods of equal diameters which are arranged in a longitudinally adjacent configuration. Each three rod configuration defines an elongate interstitial passageway between the rods which is dimensioned to closely receive a single optic fiber therethrough. A connector of this type is disclosed in U.S. Pat. No. 4,087,155. In accordance with this approach, to optically connect two fibers which extend through complimentary connector halves, the two halves are positioned within a cylindrical sleeve member and the corresponding fibers are thereby assumed to be axially aligned with respect to each other.

While this connector works well and has been generally well received by the industry, certain problems attendant upon its use prevent the connector from achieving ideal results in all situations. As mentioned previously, receipt of a fiber between the rods is difficult because the fiber diameters can vary within a specified range of tolerances. Also, in certain field situations, conditions may exist which can cause misalignment of the connector halves within the cylindrical sleeve and thereby affect the performance characteristics of the coupled waveguides within that sleeve.

SUMMARY OF THE INVENTION

The subject invention involves an improved connector for coupling optical fibers in coincident axial alignment and comprises mateably engageable connector bodies. Each body is provided with three rods in mutual longitudinal engagement radially cooperating to define an elongate interstitial space which is intended to receive a single optical waveguide therethrough. In accordance with principles of the instant invention, two of three rods of each connector body have diameters larger than the diameter of a third rod so that two smaller rods are urged toward the periphery of the third rod for positive wedging alignment in the alignment region of the mated bodies. The differing diameters of the rods in a connector body makes the interstitial passageway defined therebetween to be one of relative oversized section to facilitate receipt of a waveguide having a diameter variable within limits. The three rods of each connector body are further provided to be of a staggered configuration at the forward end of the body, with one larger diametered rod and the smaller diametered rod projecting forward to define a forward interstitial space open along a finite length thereof. The optic waveguide emerges from the interstitial space between all three rods into the forward interstitial space, and a forward prepared end surface of the waveguide is positioned coplanar with a forward end surface of the one larger diametered rod and thereafter located by reference to said surface. To couple two optical waveguides, corresponding projecting rod arrangements of complementary connector bodies are interfitted together in axially coincident engagement. The waveguides, having been preoriented and located with references to the one larger diametered rods, and having been tightly clamped in such an orientation, are thereby axially aligned and optically and mechanically connected.

Accordingly, it is an object of the instant invention to provide a fiber optic connector which can facilitate positive optical and mechanical coupling of two optical waveguides.

It is a further object to provide a fiber optic connector of the type having three rods which define an interstitial waveguide receiving passageway therebetween which is of relative oversized section to facilitate receiving a waveguide having a diameter variable within a range of tolerance limits.

A still further object of the instant invention is to provide a fiber optic connector which can protect the prepared ends of the waveguides to be optically coupled from abrasive contact against foreign surfaces.

Yet another object of the instant invention is to provide an optic waveguide connector which is comprised of hermaphroditic connector bodies.

Yet another object of the instant invention is to provide an optical waveguide connector which can be economically and readily produced.

These and other objects, which will be apparent to one ordinarily skilled in the art, are achieved by a preferred embodiment of the subject invention which is described in detail below and illustrated in the accompanying drawings.

BRIEF SUMMARY OF THE DRAWINGS

FIG. 1 is an exploded perspective view of the subject optic waveguide connector.

FIG. 2 is a perspective view of the subject connector illustrated in FIG. 1 at an intermediate stage in the mating procedure.

FIG. 2a is a sectioned view of the connector shown in FIG. 2 taken along the line 2a.

FIG. 3 is a perspective view of the subject connector illustrated in FIGS. 1 and 2 at the end of the mating procedure.

FIG. 4 is a perspective view of a simplified embodiment of the subject invention shown for the purposes of illustration. The simplified connector is shown in a position prior to initiation of the mating sequence.

FIG. 5 is a perspective view of the simplified embodiment shown in FIG. 1 at an intermediate stage in the mating procedure;

FIG. 5a is a sectional view of the simplified embodiment of the connector shown in FIG. 5 taken along the line 5a—5a;

FIG. 6 is a perspective view of the simplified connector shown in FIGS. 4 and 5 at the end of the mating procedure;

FIG. 6a is a sectional view of the simplified connector shown in FIG. 6 taken along the line 6a—6a;

Figure 2A:
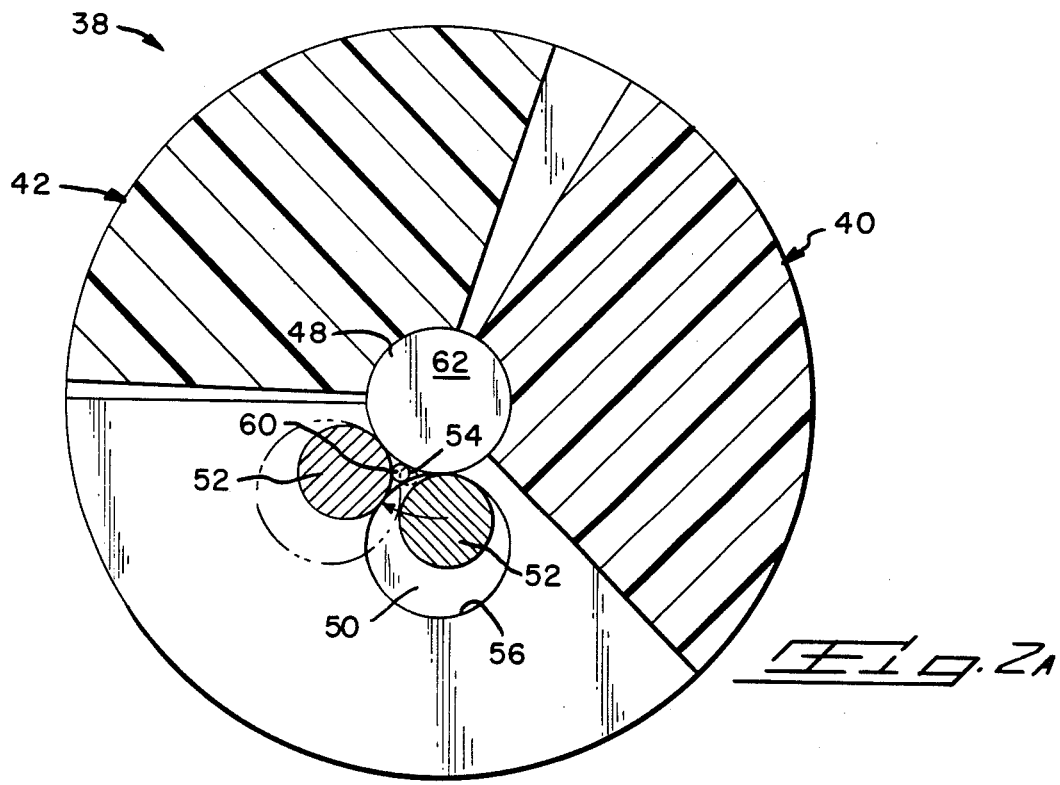

Referring first in general to FIGS. 4, 5, 5a, 6, and 6a, the principles of the subject invention are illustratively shown by a simplified connector embodiment and sequential method of using same. With particular reference to FIG. 4, the subject fiber optic connector 10 comprises first and second identical and intermateable connector bodies 12, 14, with each connector body including three elongate rods 16, 18, 20, which are axially arranged in radial cooperation to define an elongate interstitial passageway 22 therebetween. Each connector body 12, 14 is intended to receive a single optic waveguide 24, of the type commonly used in the telecommunications industry, through the appropriately provided interstitial passageway thereof. Of the three rods provided in each connector body, the first rod 16 and second rod 18 are provided having diameters larger than the diameter of the third rod 20, for a purpose to be described in detail below. Further, each rod is manufactured of a generally rigid material so that the rods tend to maintain their physical form and axial orientation. While the diameters of the larger rods are exemplarily shown to be approximately twice that of the smaller rod for the purpose of illustration, it should be appreciated that such a ratio, while preferred, is not critical to the practice of the subject invention. It is likewise not critical that the diameters of the larger rods be precisely equal.

With continuing reference to FIG. 4 the first rod 16 and the third rod 20 are adapted to axially project forward respective distances from a connector housing portion 26 of each connector body, and serve to generally comprise a mating area of each connector body. A projecting portion of the first rod 16 presents a forward reference surface 28 at a forward end thereof which is substantially transversely planar. Likewise, the projecting portion of the third rod 20 presents a transversely planar surface 30 at a forward end thereof, and the second rod similarly exposes a relative forwardly projecting planar surface 32 at its forward end. Viewing the forward mating area of each connector body in its entirety, the three rods of each body are presented in a predetermined and axially staggered arrangement with the projecting portion of the first larger diametered rod 16 occupying a longitudinally intermediate position in said arrangement.

With further reference to FIG. 4, the optic waveguide 24 is shown to axially extend through the appropriately provided interstitial passageway 22, with a forward end surface 34 of the waveguide positioned in a substantially coplanar relationship with the reference surface 28 of the first rod 16. Easy receipt of the optic waveguide 24 of a given connector body is facilitated by the three rods which define the interstitial passageway 22 extending therebetween. The difference in diameters between the first rod 16, second rod 18, and the smaller diametered rod 20, enables the entry passageway therebetween to be oversized with respect to the waveguide diameter thus facilitating easy insertion of the waveguide between the rods. A resin such as epoxy or the like (not shown) can then be introduced to secure the waveguide between the rods and thereby securely orient the waveguide end surface 34 coplanar with surface 28. Optic waveguides of the type used by the industry and illustrated at 24, are generally manufactured and sold as having a selected diametric size, specified to within a given range of tolerances. The connector can therefore initially accept within the rearward portion of its interstitial passageway any waveguide having a diameter within a specified range, and thereafter accept a suitable epoxy material to achieve secure positioning thereof. Since for the purposes of the subject invention it is critical that the forward end surface 34 of the waveguide 24 be fixedly referenced, achievement and preservation of this positioning is imperative.

As shown particularly in FIGS. 4 and 5 with regard to connector body 12, but applying equally to both identical connector bodies, the optic waveguide 24 is exposed along a length 36 thereof in the forward mating area of the connector body between the forward end surface 32 of the second rod 18, and the point of registration with the reference surface 28 of the first rod 16. This exposed length 36 of the optic waveguide 24 is craddled between the longitudinally engaged projections of the first and third rods and, thus craddled, the waveguide is protected from potentially damaging abrasion against foreign surfaces.

The intermating of two connector bodies 12, 14, is sequentially illustrated in FIGS. 5 and 6 and proceeds as follows. Referring specifically to FIGS. 5 and 5a, as opposing connector bodies are moved axially toward one another, the first rod 16 projections of opposite connector bodies align and axially engage as the respective second rods 18 and thus rod 20 projections of opposite connector bodies align generally. That is, the projections of the first and third rods of one connector body align generally with the first and second rods respectively of the opposite connector body and, upon further axial movement of the connector bodies toward each other, correspondingly aligned first rod projections engage in an axially coincident fashion. At this juncture, matched projections of the second rods 18 and third rods 20 of opposing connector bodies are in a slightly offset and axially misaligned orientation as shown in FIGS. 5 and 5a. Optical waveguides extending through respective connector bodies thus are similarly axially misaligned with respect to each other at this point in the mating procedure.

With reference now to FIGS. 6 and 6a, the intermating procedure is completed by relative rotation of the connector bodies 12, 14 so that the projections of the third rods 20 are brought into final relationship with corresponding second rods 18. Further, the relative rotation of connector bodies moves the waveguides 24 into true coaxial alignment, with the prepared end surfaces 34 accordingly brought into a mutually proximate position. Because the prepared end surfaces 34 have been registered and fixed coplanar with their respective first rod reference surfaces 28, as previously described, the resulting optical junction between the waveguide surfaces is specially minimized to improve the optical characteristics of the coupling. Moreover, rotational action of the connector bodies serves to interfit the projections of the third rods 20 over the aforementioned exposed lengths 36 of the waveguides 24 to thereby completely encapsulate the waveguides in the mating area. It should be noted that each of the waveguide lengths 36 are clamped by two smaller diametered rods 20 and one larger diametered rod 16 in the mating area of a connector body, with the smaller diametered rods 20 commonly engaging both waveguides for alignment. The combination of two smaller rods and one larger rod, which are dimensioned to form an undersize interstitial passageway, thereby provides a means of clamping or confining the waveguide lengths in precise alignment. This achieves an even tighter clamp on the waveguides and a more positive alignment in the critical alignment region of each connector body as the two smaller diametered extensions of rods 20 are urged toward each other. It should further be noted that in the rearward portion of each connector body, the passageway 22 is defined by the two larger diametered rods 16, 18 and the smaller rod 20 to more easily accommodate the insertion of the waveguide therebetween. Thus, the waveguides can be effectively aligned and optically coupled safe from abrasive stubbing, and the connector in the mated condition serves to totally encapsulate the waveguides and thereby insulate the aligned waveguides from potentially damaging contact with foreign surfaces.

As shown in FIG. 1, the preferred embodiment of the subject connector 38 comprises a pair of identical hermaphroditic connector bodies 40, 42, each having a molded housing member 44 and a single bore 46 extending longitudinally through the housing member 44. The bore 46 is profiled and dimensioned in transverse section so as to closely receive therein three rods 48, 50, 52 and a waveguide 54, configured and mutually arranged in the manner set forth above regarding FIGS. 4, 5, 5a, 6 and 6a. Portion 56 of the bore 46, which is intended to receive the third rod 52 therein, is purposefully oversized with respect to the rod 52 diameter; the reason for which being described further below. As previously disclosed for the simplified connector 10 illustrated in FIG. 4, the waveguide 54 is positioned within an interstitial passageway 58 defined by the rods and secured therein by epoxy material (not shown) or the like. With a forward end surface 60 of the waveguide 54 referenced coplanar with a forward end surface 62 of the larger diametered rod 48.

The molded housing member 44 comprises an intermediate portion 64 having a forward surface 66 coplanar with the waveguide end surface 60 and the reference surface 62, and the housing member 44 further comprises a forward alignment boss 68. As shown, to achieve hermaphrodicity, portions of each housing member 44 of connector bodies 40, 42 are sectioned away so as to receive the complimentary protrusions of an opposite connector body during the mating sequence. Each housing member 44 further has an integral locking recess 70 which is bisected by a molded barrier 72. An integral and resilient arm 74 extends longitudinally forward from the alignment boss 68 and is provided with an inwardly projecting flange 76 at the forward end thereof.

The mating of the preferred embodiment of the subject invention proceeds as follows. As shown in FIG. 2, complimentary connector bodies 40, 42 are axially brought toward each other with resilient arm 74 aligned within the lower section of recess 70, as viewed. At this juncture, as illustrated in FIG. 2a and described in principle above, the larger diametered rods 48 are axially coincident while second rod 50/third rod 52 pairings are offset and axially misaligned with respect to each other. The relatively large portion 56 of the bore 46 accommodates this initial misaligned configuration. As explained previously, the opposing waveguides 54 are also axially misaligned at this stage in the mating sequence.

Figure 3A:
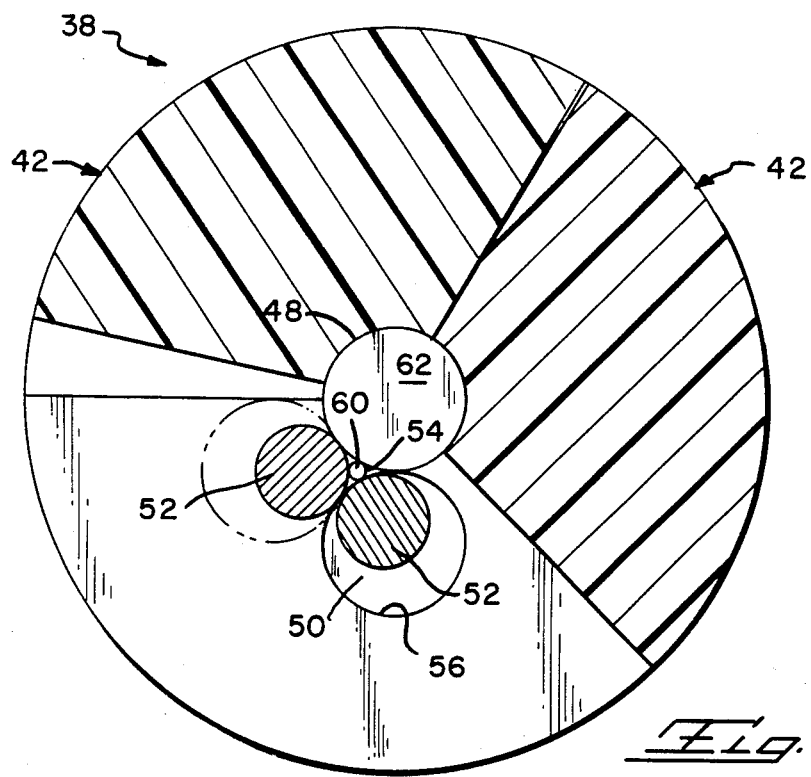
FIG. 3a is a sectioned view of the subject connector shown in FIG. 3 taken along the line 3a of FIG. 3.

To complete the mechanical mating of bodies 40, 42 and the optical coupling of waveguides 54 extending therethrough, with reference to FIGS. 3 and 3a, the connector bodies 40, 42 are relatively rotated so that the corresponding flange 76 of resilient arm 74 of each connector body resiliently slides over the molded barrier 72 of the other connector body to detachably lock the opposing bodies together. This rotational action further brings the misaligned rods and waveguides into final relationship. The waveguides thus aligned are optically coupled and signal loss minimized because the prepared end surfaces 60 of the waveguides are precisely referenced with respect to reference surfaces 62, and are closely spaced with respect to each other due to the axial coincidence of the rods 48. Further rotational action of corresponding connector bodies causes projecting portions of rods 52 to interfit over an exposed length of waveguides 54 (not shown in FIG. 3) within the bore, in the manner set forth above for the simplified connector of FIG. 4, to totally encapsulate the waveguide 54 within their respective bores. Thus encapsulated, the waveguides 54 are protected the entire longitudinal length of the mated connector. It should be appreciated that the forward projecting rods 52 as shown by FIG. 1 mutually engage both waveguides 54 in the mated position, and having two surfaces (the portions of the rods which engage the waveguides) common to both waveguides achieves positive alignment as well as tight clamping engagement as the smaller rods 52 are urged toward the circumference of the larger rods 48.

The portions of the larger rod 48 and smaller rod 52 engaging a waveguide in a respective connector body are said to constitute the alignment surfaces of that body.

While the above description of the preferred and simplified embodiments exemplifies the principles of the subject invention, other embodiments which will be apparent to one skilled in the art and which utilize the teachings herein set forth are intended to be within the scope and spirit of the subject invention.

I claim:

1. In an optical waveguide connector of the type having a pair of matingly engaged connector bodies, each body provided with three rods radially cooperating to define an elongate interstitial space for receiving a corresponding waveguide, the improvement comprising:

two of said rods of each connector body having diameters larger than the diameter of a third rod, said interstitial space defined by said rods being of oversized sectional dimension in relation to the diametric size of a waveguide received therein and having a diameter variable within a specified range;

said third smaller rod and one of said two larger-diameter rods of each connector body axially projecting forward respective distances from the other of said two rods with a forward length of said corresponding waveguide engagingly received therebetween, and said third smaller rod axially projecting forward from said one of said two rods to radially engage and wedge the forward length of waveguide of the opposite connector body against the corresponding forward projecting rods of the other connector body, whereby the forward lengths of both waveguides each are wedged between two said third smaller diametered rods and one said larger diametered rod.

2. The optical connector recited in claim 1 wherein each connector body comprises further material adhesive means within said passageway for securing said waveguide radially against two of said three rods.

3. The connector as set forth in claim 1 wherein said waveguide in each said connector body having a prepared end fixedly referenced to a forward end surface of a respective said one of said two rods.

4. The connector as set forth in claim 1, wherein each connector body further comprises housing means having an elongate bore therethrough dimensioned and profiled in section to closely receive therein said three rods and said corresponding waveguide therebetween, said housing means having a forward alignment portion mateable with a like alignment portion of the housing means of the other connector body for bringing both said housing means into aligned engagement.

5. The connector as set forth in claim 4, wherein each said housing means further includes integral locking means for detachably engaging like locking means of the other said housing means to detachably hold both said housing means together.

6. In an optical waveguide connector unit, of the type intended for mating engagement with another connector unit or the like and including three rods radially cooperating to define an elongate interstitial space for receiving a corresponding waveguide, the improvement comprising:

two of said rods of said connector unit having diameters larger than the diameter of a third rod, said space defined by said rods being of oversized sectional dimension in relation to the diametric size of a waveguide received therein and having a diameter variable within a specified diametric range;

said third smaller diametered rod and one of said two larger-diameter rods of each connector body axially projecting forward respective distances from the other of said two rods with a forward length of said corresponding waveguide engagingly received therebetween, and said third smaller rod axially projecting forward from said one of said two rods for radially engaging and wedging the forward length of waveguide of a second connector unit against the corresponding forward projecting rods of the second connector unit.

7. The connector unit recited in claim 6 wherein the connector unit further comprises material adhesive means within said passageway for securing said waveguide therein.

8. The connector unit as set forth in claim 6, said unit further comprising means for securing said corresponding waveguide within said passageway; and housing means having an elongate bore therethrough dimensioned and profiled in section to closely receive therein said three rods and said corresponding waveguide therebetween, said housing means having a forward alignment portion engageably mateable with the forward alignment portion of the housing means of another connector unit.

9. In an optical waveguide connector of the type having a pair of matingly engaged connector bodies, each said connector body comprising three rods in mutual longitudinal engagement defining therebetween a passageway for receiving a corresponding waveguide, the improvement comprising:

two of said rods having diameters larger than the diameter of the third rod so that said passageway is dimensioned in profiled section to be oversized in relation to the diametric size of the waveguide, and each said connector body comprising material means for securing the waveguide within said passageway, said third smaller-diametered rod and one of said two larger-diametered rods of each connector body axially projecting forward respective distances from the other of said two rods with a corresponding forward length of waveguide engagingly received therebetween, said third smaller-diametered rod axially projecting forward from said one of said two rods to radially engage and wedge the forward length of waveguide of the second connector body against the corresponding forward projecting rods of the second connector body, whereby forward lengths of both waveguides are wedged between two said third smaller diameter rods and one said larger-diameter rod, and each said connector body further comprising housing means having a bore therethrough for receiving corresponding said three rods therein, and said housing means having alignment means engaging like alignment means of the other connector body housing means.

* * * * *